United States Patent [19]

Young

[11] 4,059,170

[45] Nov. 22, 1977

[54] FIRE ENGINE CONSTRUCTION

[75] Inventor: Richard E. Young, Lancaster, N.Y.

[73] Assignee: Young Fire Equipment Corporation, Lancaster, N.Y.

[21] Appl. No.: 672,777

[22] Filed: Apr. 1, 1976

[51] Int. Cl.[2] .................... B60K 1/00

[52] U.S. Cl. .................... 180/54 R; 180/54 A; 280/106 R; 182/65

[58] Field of Search .................... 180/54 R, 54 A, 68 R, 180/68 P, 64 R, 64 L, 64 M, 89.1, 1 R, 85; 182/65, 66, 67; 212/38; 237/12.3 A, 12.3 R; 98/2.05; 280/106 R

[56] References Cited

U.S. PATENT DOCUMENTS

| | | | |
|---|---|---|---|
| 1,846,567 | 2/1932 | Murray, Jr. | 280/106 R |
| 3,622,171 | 11/1971 | Gottschalk | 280/106 R |
| 3,625,304 | 12/1971 | Siefermann et al. | 182/65 |
| 3,738,442 | 6/1973 | Eiler | 212/38 |

FOREIGN PATENT DOCUMENTS

| | | | |
|---|---|---|---|
| A67,140 | 6/1957 | France | 180/54 A |
| 695,729 | 8/1940 | Germany | 180/54 A |
| 674,049 | 6/1952 | United Kingdom | 180/89.1 |

*Primary Examiner*—Joseph F. Peters, Jr.
*Assistant Examiner*—Donn McGiehan
*Attorney, Agent, or Firm*—Joseph P. Gastel

[57] ABSTRACT

A boom carrying vehicle such as a fire engine having an extremely high-strength, low-weight frame including a chassis having front and rear wheels, a cab mounted proximate said front wheels, a turntable mounted proximate said rear wheels, a boom mounted on said turntable, an engine mounted on said chassis immediately forward of said rear wheels, said chassis being fabricated from a plurality of box sections extending lengthwise of the vehicle and a cross box section connecting the lengthwise box sections in the area of the rear axle so as to provide high torque resistance to the chassis both when it is being driven and when it is stationary with the boom in operation, a control panel and an operator platform located between the engine and the cab, and a fan assembly for directing air heated by the engine toward the control panel to prevent freezing thereof in cold weather.

16 Claims, 23 Drawing Figures

11
27
27a
28
75
100
101
102
103
104
106
107
108
109
110
111
113
114
115
18
20
21

FIRE ENGINE CONSTRUCTION

The present invention relates to an improved fire engine construction.

By way of background, in recent years fire engines have become more elaborate because of the added equipment they require. This in turn has made it difficult to obtain fire engines which were sufficiently lightweight so as to be able to provide good roadability and cornering. The problem was especcially pronounced with fire engines which mounted a boom on a turntable at the rear of the chassis. In fire engines of this type a subframe had to be mounted on the vehicle chassis to provide added strength to the latter so that it could support the boom. However, the weight of the subframe and the chassis caused the vehicle to be undesirably heavy. In addition, the different bending moments of the chassis and the subframe caused high stresses to occur. In addition, the vehicle engine was mounted toward the front of the vehicle so that the weight distribution on the front wheels was exceptionally high, which in turn caused undesirably high loading on the front tires. This in turn not only reduced the good handling characteristics but also constituted a safety hazard because the front tires were loaded excessively. In addition to the foregoing, the control panel, which was mounted behind the cab, was unheated and therefore there was the distinct possibility of the controls freezing when the fire engine was operated in cold weather. Furthermore, the operator had to stand on the ground to operate the control panel. It is with overcoming the above deficiencies of prior art fire engine constructions that the present invention is concerned.

It is accordingly one important object of the present invention to provide an improved fire engine which has a frame construction which is of extremely high strength and relatively light weight and which has its center of gravity so positioned that the major loading of the vehicle is carried by the rear wheels thereby providing good roadability as well as high strength.

Another object of the present invention is to provide an improved fire engine having a high-strength relatively low-weight frame which is highly torque resistant so that it can absorb the torque to which it is subjected when being driven on the road as well as the torque to which it is subjected when the boom is in operation.

A further object of the present invention is to provide an improved fire engine construction in which the driving engine is mounted rearwardly of the midpoint of the vehicle chassis and immediately forward of the rear wheels which can provide in certain models a highly desirable weight distribution with approximately two-thirds of the load being carried by the rear axle and approximately one-third of the load being carried by the front axle, thereby providing good road handling characteristics.

Yet another object of the present invention is to provide an improved fire engine construction wherein the vehicle radiator is so mounted relative to the control panel that the heated air leaving the radiator is directed at the control panel of the fire engine so as to prevent parts contained therein from freezing in cold weather. A related object is to provide a platform immediately behind the cab so that the panel operator does not have to stand on the ground where he would be subject to electrical shock in the event that the boom made contact with high voltage wires. Other objects and attendant advantages of the present invention will readily be perceived hereafter.

The present invention relates to a boom carrying vehicle such as a fire engine or the like comprising a chassis having front and rear ends, a cab mounted proximate said front end, a turntable mounted proximate said rear end, a boom mounted on said turntable, front wheel means secured to said chassis proximate said front end, rear wheel means secured to said chassis proximate said rear end, an engine mounted on said chassis between said cab and said rear wheels, drive means coupled between said engine and said rear wheels, said chassis between said turntable and an area between said engine and said cab being formed of a plurality of joined box sections extending lengthwise of said chassis to provide high rigidity to said chassis against twisting.

The present invention also relates to a vehicle comprising a frame having a front end and a rear end, a cab located proximate said front end, front wheels located proximate said front end, rear wheels located proximate said rear end, an engine mounted on said frame between said front and rear wheels, a control panel on said frame between said cab and said engine, and fan means for directing air heated by said engine toward said control panel to keep said control panel warm in cold weather. The various aspects of the present invention will be more readily understood when the following portions of the specification are read in conjunction with the accompanying drawings wherein:

Figure 1:
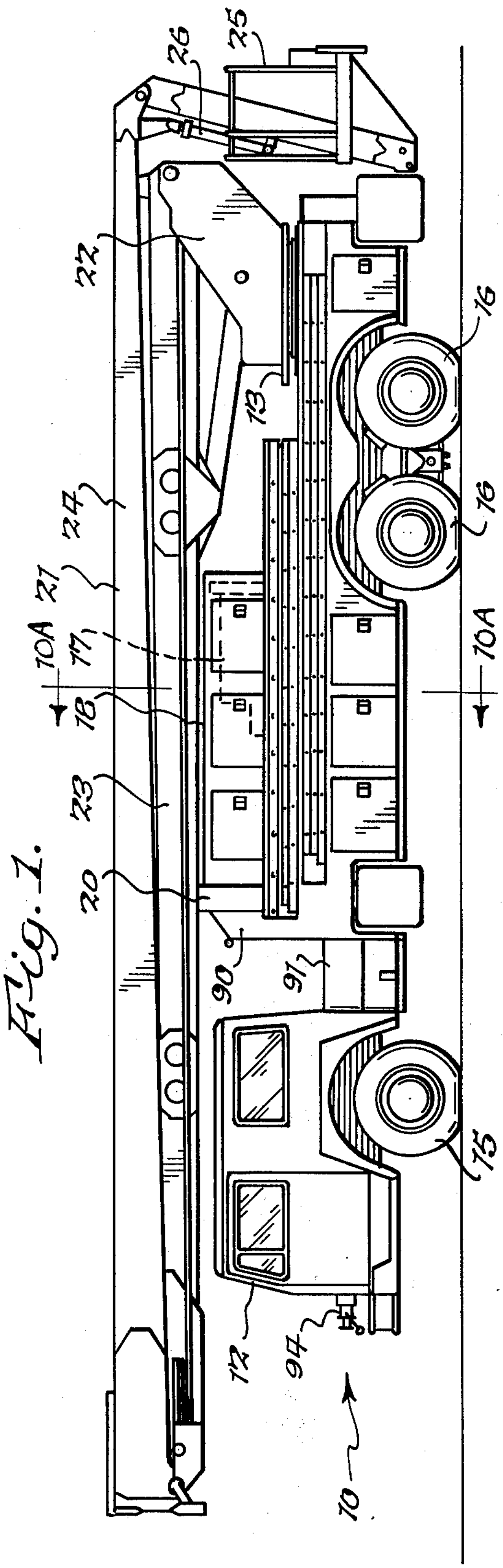
FIG. 1 is a side elevational view of the improved fire engine of the present invention.
Figure 13:
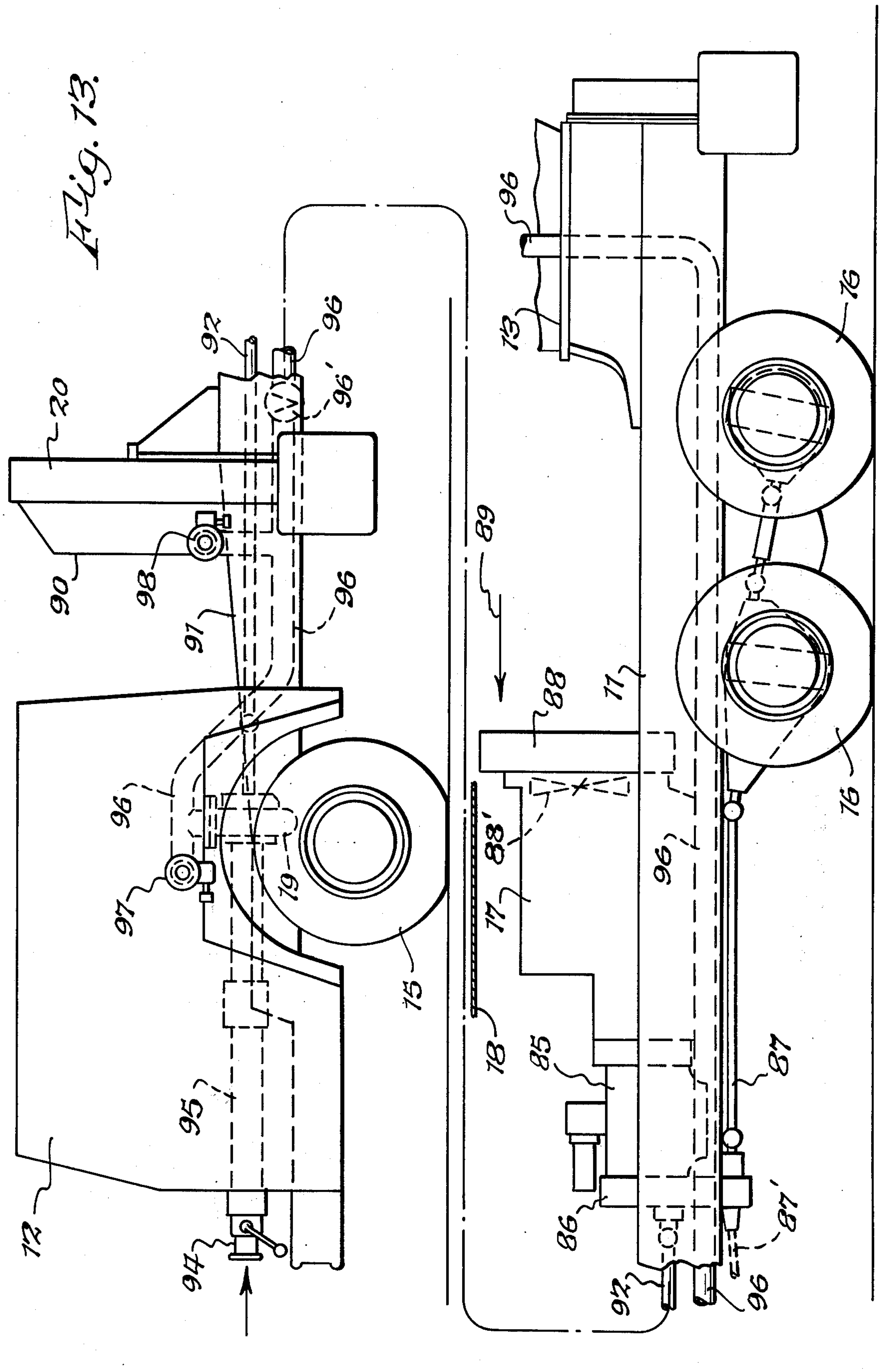
FIG. 13 is an expanded enlarged fragmentary side elevational view of the fire engine shown in FIG. 1 with various portions of the fire engine mounted on the chassis.

The improved fire engine 10 includes a chassis or frame 11. A cab 12 is mounted on the front end of chassis 11 and a turntable 13 is mounted on turntable base 14 located at the rear end of chassis 11. A pair of front wheels 15 and two pairs of tandem rear wheels 16 are suitably mounted on frame 11. An engine 17 (FIG. 13) is mounted immediately forward of rear wheels 16 and substantially at the midpoint of chassis 11 and is enclosed within a housing 18 (FIG. 1). Engine 17 drives the rear wheels 16 and also supplies the motive power for driving pump 19 (FIG. 13).

As is well understood, whenever fire engine 10 is traveling on the road, the boom structure 21, which has its portion 22 mounted on turntable 13, is positioned so that the links 23 and 24 extend substantially lengthwise of the vehicle. The central portion of link 23 is supported by inverted U-shaped boom support 20 having its vertical legs attached to bulkhead 29. As is understood, in operation the boom 21 can move in a 360° arc so as to place the platform 25 at any desired location whereby the platform operator can direct the water emanating from hose 26 in any desired direction.

Figures 4, 5, 6, 7, 8:
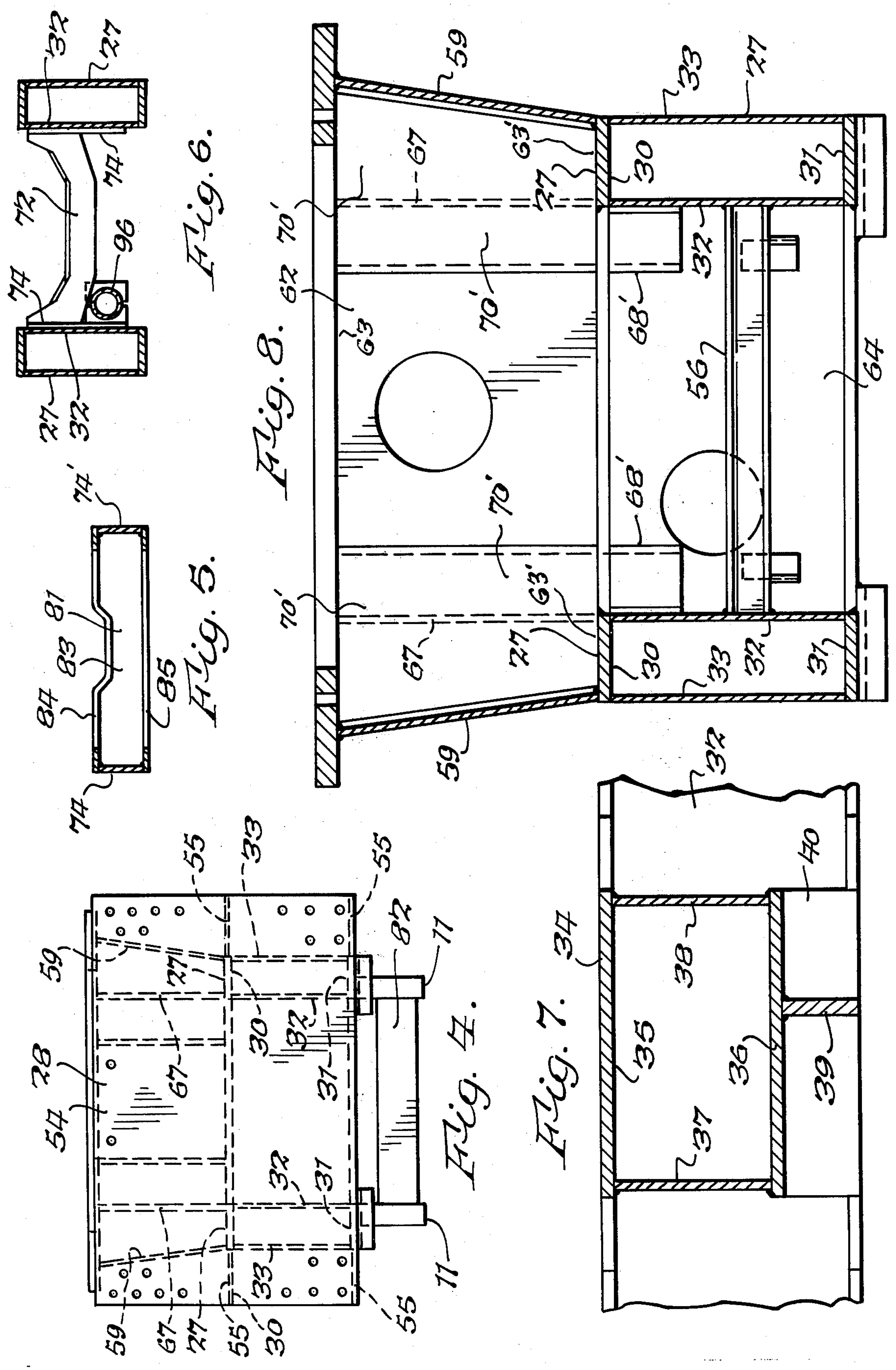
FIG. 4 is an end elevational view taken from the right of FIG. 2 and showing the rear of the chassis.
FIG. 5 is a cross sectional view taken substantially along line 5—5 of FIG. 3 and showing the configuration of the chassis at that area.
FIG. 6 is a cross sectional view taken substantially along line 6—6 of FIG. 3 and showing the spaced box sections of the chassis connected by a cross frame member.
FIG. 7 is a fragmentary cross sectional view taken substantially along line 7—7 of FIG. 2 and showing the third box section of the chassis immediately forward of the turret for providing increased rigidity against bending.
FIG. 8 is a cross sectional view taken substantially along line 8—8 of FIG. 3 and showing the structure of the chassis and turret in this area.

Whenever engine 10 has arrived at the location of a fire, stabilizing extenders or outriggers, such as shown in FIGS. 11-12 or FIGS. 17-21, are placed on the ground to stabilize the vehicle and boom 21 can be operated. However, it is imperative that chassis 11 have sufficient rigidity so that it can withstand the torsional stress to which it is subjected both by the movement of boom 21 and the torsional shocks to which it is subjected when being driven on the road. In this respect, chassis 11 consists of an unique construction so as to provide the desired rigidity. More specifically, chassis 11 essentially comprises a pair of hollow rectangular frame members 27 which are of uniform cross sectional dimension between rear bulkhead 28 and front bulkhead 29. Each frame member 27 includes a top plate 30, a bottom plate 31 and spaced side plates 32 and 33 (FIG. 8). Plates 30, 31, 32 and 33 are suitably welded to each other to form the hollow box sections 27. A hollow rectangular box section 34, which is formed of steel plates 35, 36, 37 and 38 (FIG. 7) welded to each other in the shape of a hollow rectangular solid, extends between plates 32. The extreme ends of plates 35, 36, 37 and 38 are welded to plates 32 of box sections 27. A plate 39 (FIG. 7) has its opposite ends welded to plates 40 which are welded to plates 32, thereby providing still further rigidity in the area of chassis 11. Box section 34, located approximately over the rear axle 28' is highly effective in providing the high rigidity and light weight. The front axle 29' is located immediately under cab 12.

Figure 2:
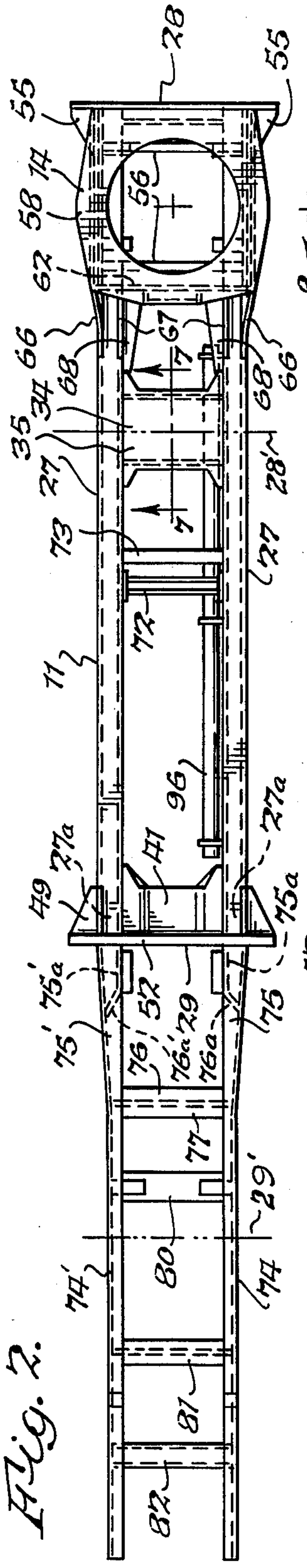
FIG. 2 is a plan view of the frame or chassis of the fire engine.
Figure 3:
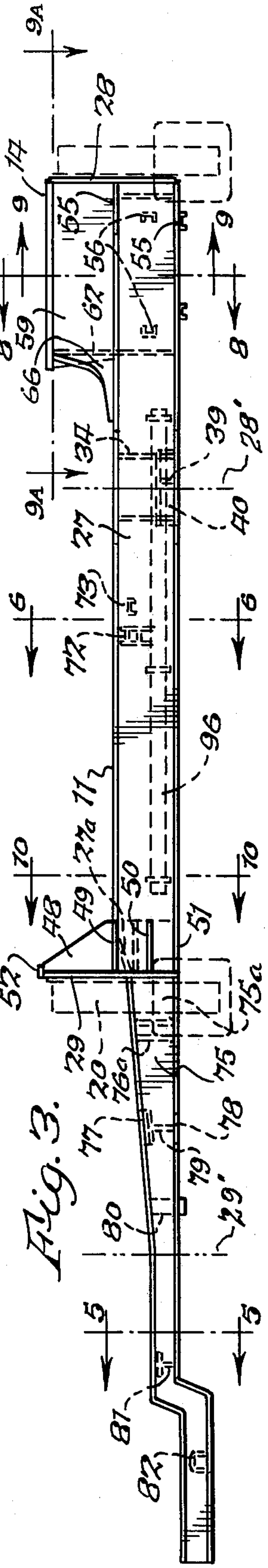
FIG. 3 is a side elevational view of the chassis of FIG. 2.
Figure 10:
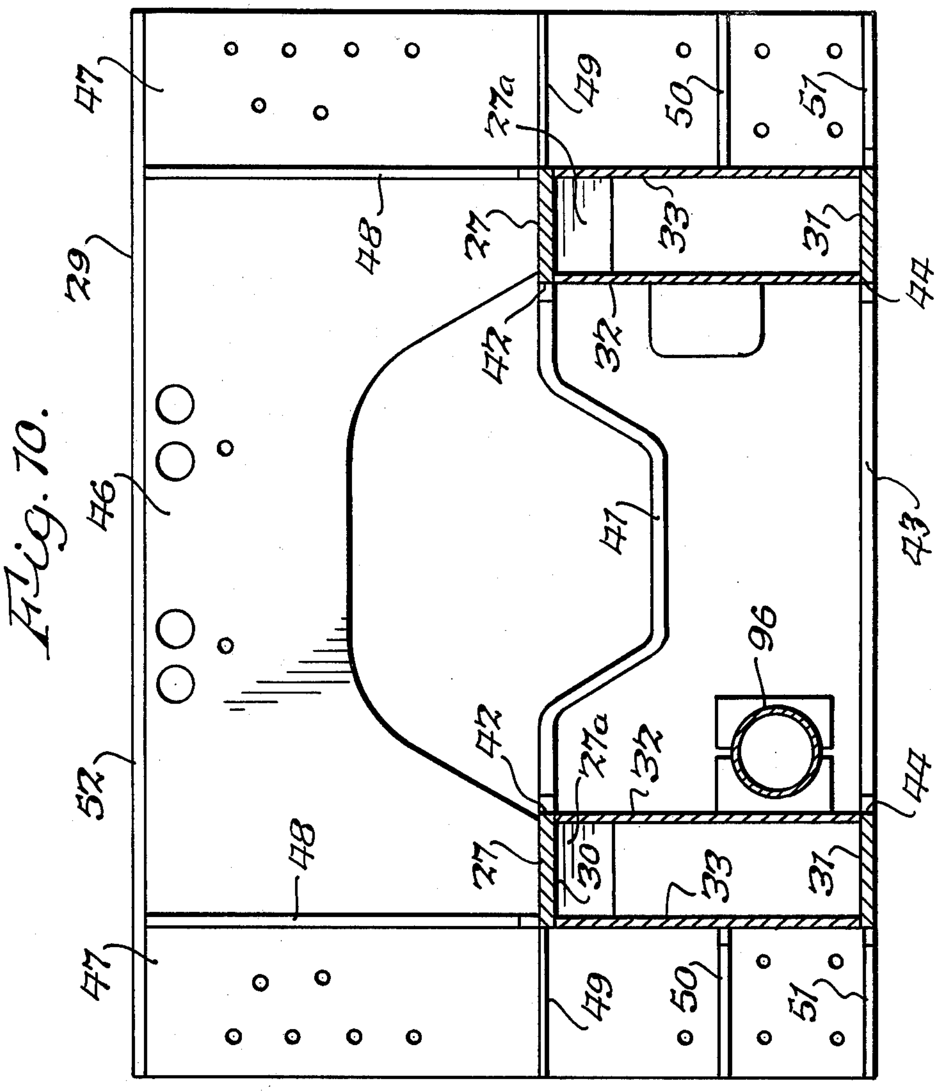
FIG. 10 is a cross sectional view taken substantially along line 10—10 of FIG. 3 and showing the structure of the chassis in this area.

Box sections 27 terminate at one end at bulkhead 29 (FIGS. 2, 3 and 10). Upper U-shaped plate 41 (FIGS. 2 and 10) has its opposite ends welded to the inner edges of plates 30 at 42 (FIGS. 2 and 10). Lower plate 43 has its opposite edges welded to plates 31 at 44. Thus, plates 41 and 43 provide a box section with plates 32, and plates 32 are parts of the box sections 27. Thus, in the area of bulkhead 29 there is a triple box section for the purpose of providing rigidity against twisting. This rigidity is necessary for two reasons. The first is to prevent the chassis 11 from twisting unnecessarily when the vehicle is in transit. The second reason is to prevent the chassis 11 from twisting unnecessarily when the outrigger legs are lowered and the boom 21 is in operation.

The bulkhead structure 29 includes a central plate 46 having end portions 47 (FIG. 10). Gussets 48 are located between plate 46 and plates 30 of box sections 27 (FIGS. 3 and 10). Additional gussets 49, 50 and 51 are located between plates 33 of box sections 27 and plate portions 47. A bar 52 is welded to the top of plates 46 and 47 and across the top edges of gussets 48 to add rigidity to the bulkhead assembly.

The rear bulkhead 28 (FIGS. 2, 3, 4 and 9) comprises a rectangular plate 54 welded to the ends of box sections 27, and more specifically to the ends of plates 30, 31, 32 and 33 which comprise box sections 27. Gussets 55 (FIGS. 3, 4 and 9) are located between plate 54 and plates 33 of box sections 27. Channels 56 have their opposite ends welded to plates 32 of box sections 27.

Figure 9:
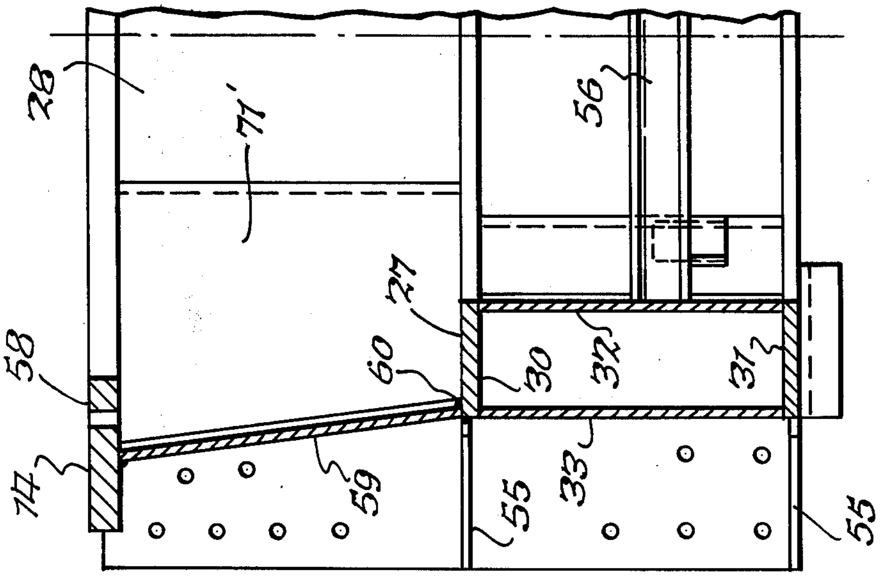
FIG. 9 is a fragmentary cross sectional view taken substantially along line 9—9 of FIG. 3 and showing the structure of the chassis and turret in this area.
Figure 9A:
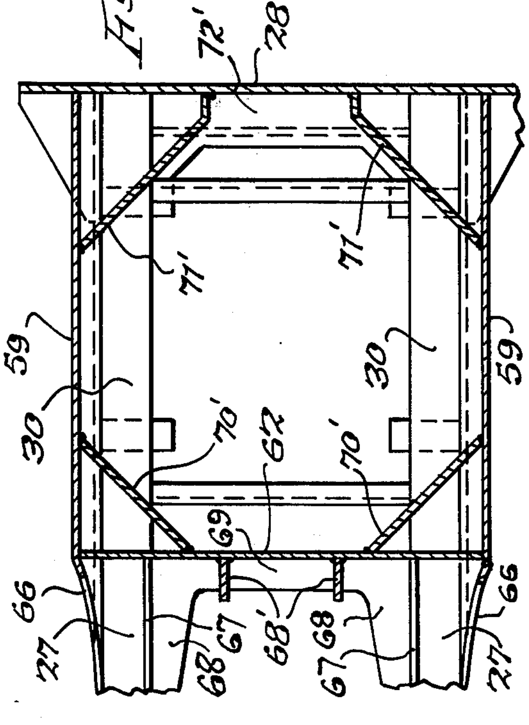
FIG. 9A is a fragmentary cross sectional view taken substantially along line 9A—9A of FIG. 3 and showing details of construction of the turret.

The turntable base 14 (FIGS. 2, 3, 4 and 9) includes a plate 58 having its underside welded to the tops of side plates 59 which have their lower edges welded to plates 30 at 60 (FIG. 9). A front plate 62 has its top edge 63 welded to the underside of plate 58 and portions of its bottom edge are welded to the tops of plates 30 at 63' and the remainder of plate 62 is formed into a portion 64 which has its opposite sides welded to sides 32 of box sections 27. Two pairs of gussests 66 and 67 extend between plate 62 and top plate 30 of box sections 27 (FIGS. 2, 3, 8 and 9A). Additional gussets 68 are located between plates 32 and plate 62 (FIGS. 2 and 9A). Ribs 68' extend along the outer face of plate 62 between plate 58 and plate 69' which joins plates 68 (FIG. 9A). Corner plates 70' have their opposite vertical edges welded to plates 62 and 59 (FIGS. 8 and 9A), and corner plates 71' have their opposite vertical edges welded to plates 28 and 59 (FIGS. 9 and 9A). The tops of plates 70' and 71' are welded to the underside of plate 58. The bottoms of plates 70' are welded to the top plates 30 of box sections 27. The bottoms of plates 71' are welded to plate 72' which extends between top plates 30 (FIG. 9A).

Additional bracing structure is supplied between box sections 27 (FIGS. 2, 3 and 6). This additional bracing structure includes a U-shaped frame member 72 which has its opposite ends welded to plates 74 which in turn are welded to side plates 32 of box sections 27. In addition, a channel member 73 has its opposite ends welded to plates 32.

The portion of chassis 11 to the left of bulkhead 29 in FIGS. 2 and 3 consists of channel members 74–74′ which are mirror images of each other. Channels 74–74′ include tapered portions 75–75′, respectively, which terminate at frame member 76 (FIG. 3) which is essentially a modified form of I-beam having flanges 77 and 78 connected by a web 79. To the left of member 76, frame members 74 and 74′ are connected by cross members 80, 81 and 82 (FIG. 5). Member 81 is essentially an I-beam having a web 83 connecting flanges 84 and 85. Member 82 is an inverted channel. Plates **75*a*-75*a′* are welded to and close the open sides of channels 74-74′, respectively, as shown in FIGS. 2 and 3, to provide additional box sections. In addition, rectangular plates 27*a* are located within box sections 27 and have their outer edges welded to plates 30, 32 and 33, and to bulkhead 29 (FIGS. 2, 3 and 10). Because of the foregoing construction at bulkhead 29**, an extremely strong framework is provided to withstand the rigors to which the frame will be subjected.

The above described construction of chassis 11 provides extremely high strength to support the vehicle both when it is in transit and when it is stabilized by its outriggers for use of boom 21. In addition, the foregoing construction provides extremely high strength and light weight so that the vehicle can travel over practically all roadways. In this respect one modification of the vehicle fully loaded and equipped weighs approximately 50,000 pounds with the weight distribution being such that approximately 34,000 pounds is supported by the rear axle and approximately 16,000 pounds by the front axle. This is a relatively optimum weight distribution to provide excellent handleability and cornering. The light weight of the vehicle is also made possible because the usual subframe required to mount the boom is obviated because the chassis 11 is strong enough to support the boom without using a subframe. However, it will be appreciated that different models will have different weight distribution depending on the type of boom and accessories associated therewith.

Figure 10A:
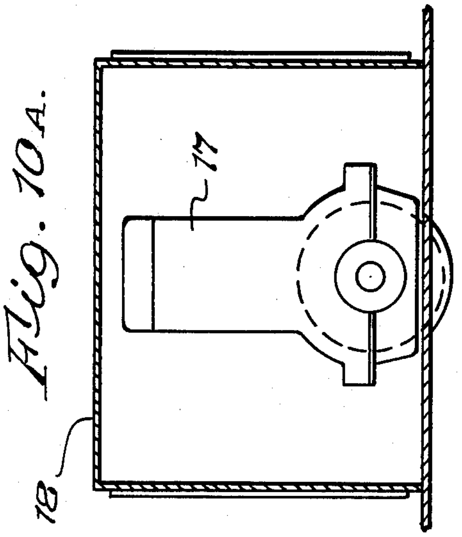
FIG. 10A is a fragmentary cross sectional view taken substantially along line 10A—10A of FIG. 1 and showing how the engine is mounted within the engine housing.

In accordance with the present invention the engine 17 which drives the vehicle is positioned on the chassis 11 beyond its midpoint and toward the rear thereof and immediately forward of the rear wheels 16 (FIG. 13). Engine 17 faces rearwardly and is coupled to a transmission 85 which in turn is coupled to a "drop-box" 86 which is essentially a gear box for causing the rotary motion produced by transmission 85 to be transmitted to drive shaft 87 which is suitably coupled to the rear axles which drive wheels 16. It is to be especially noted that engine 17 and transmission 85 are mounted on an upper side of chassis 11 for ease of access. In addition it is to be noted that the radiator 88 faces rearwardly and the fan 88′ associated therewith pulls air over radiator 88 in the direction of arrow 89 so as to cause such air to pass over engine 17 and to be directed by housing 18 (FIGS. 1 and 10A) toward the control panel 90 adjacent platform 91 on which the control panel operator stands. This serves a plurality of functions. The panel operator, by standing on platform 91, is thus off of the ground so that he will not be shocked in the event the tower engages a high voltage electrical wire. In addition, heated air is supplied to all areas of the control panel to prevent them from freezing in cold weather. This freezing may be due to either the cold air or the coating of the various parts in the control panel with water which may turn to ice in the absence of the heat supplied by engine 17. Also, the heat keeps the control panel operator warm. The heated air is forced downwardly between frame sections 27.

An optional front wheel drive shaft 87′ may be installed on drop-box 86 (FIG. 13) to provide added traction in the event the chassis is to be used in areas where this is required, or in the event the chassis is to be used for vehicles, other than fire engines, which require a front wheel drive.

As can also be seen from FIG. 13, there is a drive shaft 92 leading from drop box 86 and coupled to pump 19. Because of the construction of the gear box 86, the engine 17 can be selectively used for driving pump 19 when the vehicle is stationary, and when so used the pump-driving shaft 92 is caused to rotate at a speed which is twice engine speed so that additional step-up gearing is not required. An inlet valve 94 is located at the front of cab 12 and it is in communication with conduit 95 leading to pump 19. The water outlet conduit 96 terminates at a number of outlets 97 and 98 at the sides of the vehicle. At this point it is to be noted that there is an outlet 97 on each side of the vehicle and an outlet 98 on each side of the vehicle so that a hose can be directly connected to any one of the four outlets. The water outlet conduit 96 also is coupled to the chassis and leads into the boom 21 and ultimately terminates at hose nozzle 26 (FIG. 1), so that the water being pumped by pump 19 supplies boom 21. A valve 96′ is located in conduit 96 at the location shown in FIG. 13, and this valve is controlled from the pump panel 90 to selectively supply water to the nozzle 26.

In FIGS. 17–21 one form of the outrigger or extender construction is shown. Outrigger 100 is secured to the chassis immediately under the boom support 20 and outrigger 101 is mounted on rear plate 28. Outriggers 100 and 101 are identical in construction and are conventional. Therefore, only a brief description of their actual construction will be given. In this respect, each includes a housing 102 slidably mounting a horizontal member 103 therein. A suitable hydraulic motor causes member 103 to move out laterally from the vehicle. A second hydraulic motor 104 (FIG. 18) has a foot (not shown) mounted at the lower end thereof. After member 103 has been extended laterally, motor 104 is actuated to cause the foot to be moved into engagement with the ground. It will be appreciated that the outrigger moves out laterally on both sides of the vehicle. The present construction differs from previous constructions in that front outrigger 100 is secured to the underside of chassis 11, and more specifically, to the underside of frame members 75–75′. In this respect, triangular ribs 106 and 107 have their horizontal portions welded to the horizontal legs of channels 75–75′. Nut and bolt assemblies 108 attach flanges 109 to gussets 106 and 107, flanges 109 being welded to housing 102. The rear outrigger 101, as noted above, is identical in construction to the front outrigger 100 and is attached to the chassis 11 by triangular plates 110. In this respect, plates 110 have their upper edges welded to the underside of box sections 27 and nut and bolt assemblies 111 attach flanges 109 thereto. A bracket 113 is secured to plate 28 by means of bolts 114 and has plate 115 secured to housing 102, as by welding. Because of the fact that the outriggers are bolted to the chassis they are replaceable without burning or welding.

Figure 12:
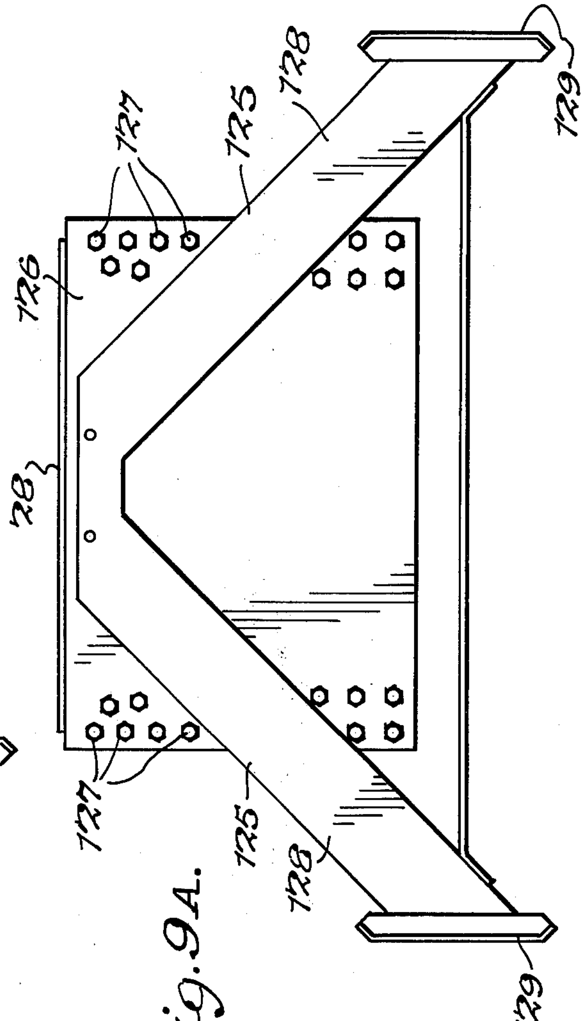
FIG. 12 is a rear view of the portion of the frame shown in FIG. 4 and having the outriggers mounted thereon.
Figure 11:
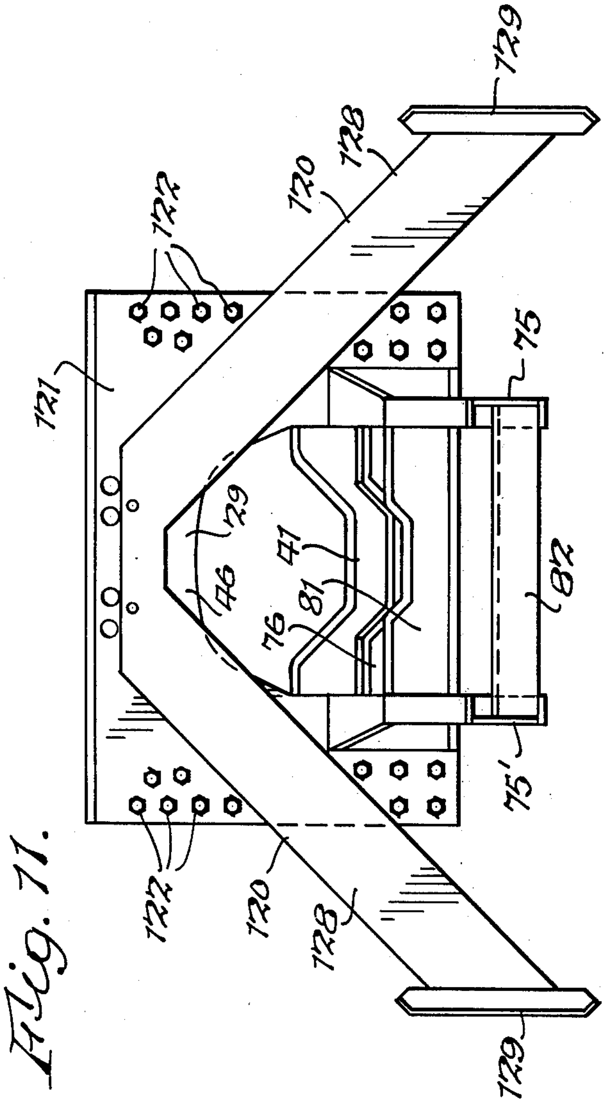
FIG. 11 is an end elevational view of the portion of the frame shown in FIG. 10 having the outriggers mounted thereon.

In FIGS. 11 and 12 a preferred alternate form of outrigger or extender is shown. This form is also conventional and is known as an A-frame type. In this respect, front outriggers 120 are mounted on plate 121 which is suitably secured by bolts 122 to bulkhead 29. The rear extenders 125 are mounted on plate 126 which is bolted on rear bulkhead 28 by means of bolts 127. As noted above, extenders or outriggers 120 and 125 are conventional and in this instance are identical. They essentially consist of hydraulic motors within the tubular housings 128 which move legs (not shown) outwardly and downwardly along the axes of housings 128. Feet 129 are pivotally mounted at the ends of the legs and as soon as the legs start moving outwardly feet 129 will pivot from a vertical position to a horizontal position and will come to rest on the ground. Because the outrigger shown in FIGS. 11 and 12 are bolted to the chassis they can be replaced without burning or welding.

Figures 14, 15, 16:
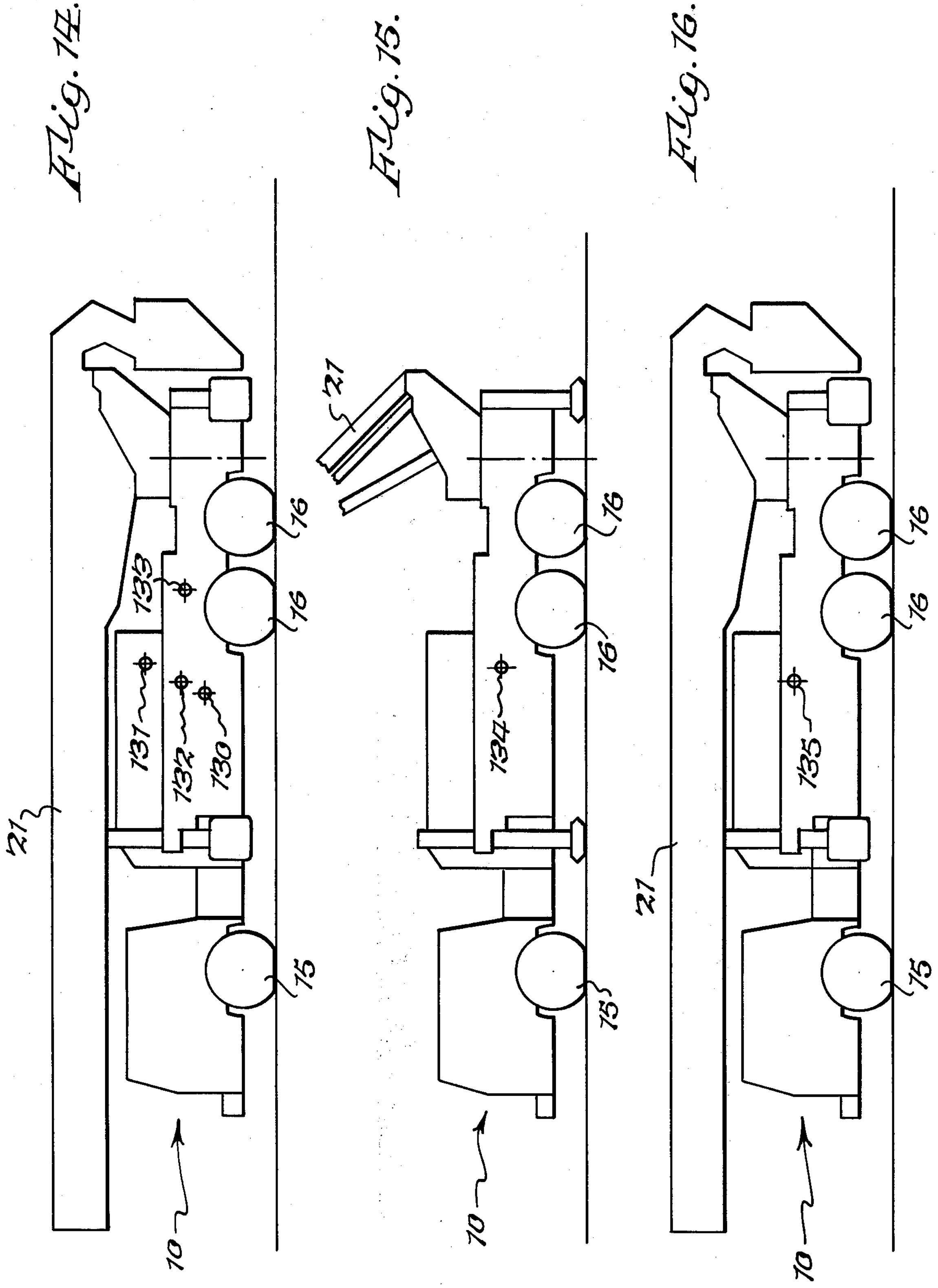
FIG. 14 is a diagrammatic side elevational view of a fire engine of the type shown in FIGS. 1-13 and showing the location of the centers of gravity of various parts of the fire engine.
FIG. 15 is a fragmentary side elevational view of the fire engine shown in FIGS. 1-13 and showing the location of the combined center of gravity of the chassis, outriggers and body trim when the fire engine is in a stabilized condition.
FIG. 16 is a fragmentary side elevational view of the fire engine such as shown in FIGS. 1-13 and showing the center of gravity of the fire engine when the engine is in the traveling mode.
Figures 17, 18, 19, 20, 21:
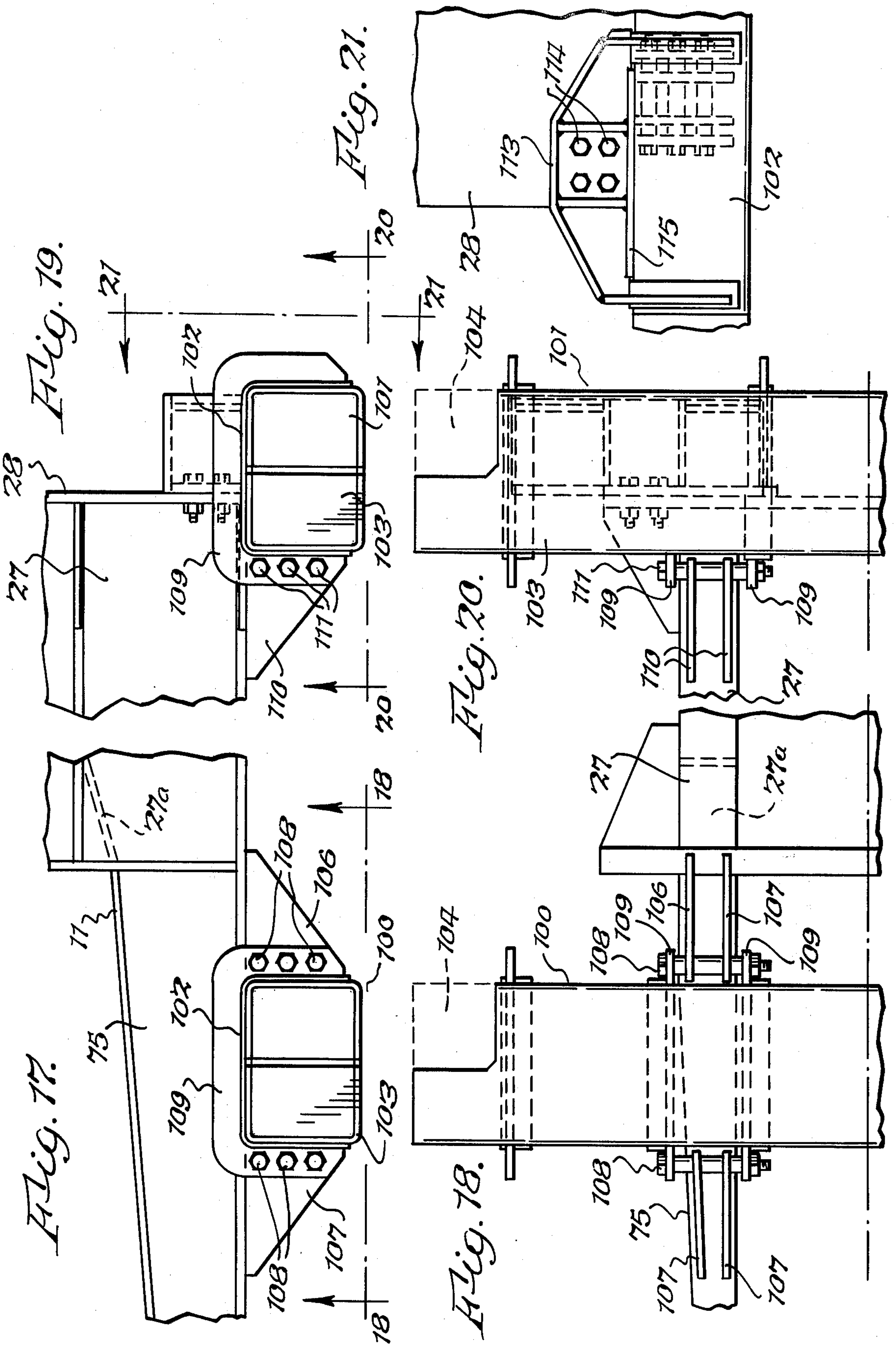
FIG. 17 is a fragmentary side elevational view of a portion of the frame mounting outriggers or extenders of a different type than shown in FIGS. 11 and 12.
FIG. 18 is a fragmentary bottom plan view taken substantially along line 18—18 of FIG. 17.
FIG. 19 is a fragmentary side elevational view showing extenders of the type shown in FIG. 17 but mounted on the rear plate of the chassis.
FIG. 20 is a bottom plan view taken substantially along line 20—20 of FIG. 19.
FIG. 21 is an end elevational view taken substantially along line 21—21 of FIG. 19.

In FIGS. 14–16 the weight distribution of one model of fire engine is shown. In FIG. 14 the center of gravity of the chassis is shown at 130, the center of gravity of the outriggers and the trim at 131, the center of gravity of the aerial assembly at 132, and the center of gravity of loose equipment and fuel at 133. In FIG. 15 the combined center of gravity of the truck chassis, outriggers and body trim when the vehicle is stabilized by the outriggers is shown at 134. The center of gravity of the fire engine in the traveling mode with the boom stowed is shown at 135. From FIG. 16 it can be seen that the center of gravity is immediately forward of the rear wheels and this causes approximately two-thirds of the load of the entire vehicle to be carried by the rear axle and approximately one-third to be carried on the front axle. This, as noted above, provides excellent cornering and roadability. It is especially important that the major portion of the weight be shifted to the rear wheels where it can be supported on eight tires (two pairs of tandems) rather than on the front two tires. It will be appreciated, as noted above, that the weight distribution will vary with the type of boom and the accessories of any particular fire engine.

Furthermore, while the preceding description has been directed primarily to a fire engine, it will be appreciated that the principles of the present invention may apply to any boom-carrying vehicle.

It can thus be seen that the improved fire engine of the present invention is manifestly capable of achieving the above enumerated objects, and while preferred embodiments have been disclosed, it will be appreciated that the present invention is not limited thereto but may be otherwise embodied within the scope of the following claims.

What is claimed is:

1. A boom-carrying vehicle such as a fire engine or the like comprising an elongated chassis for mounting a boom and having front and rear ends, a cab mounted proximate said front end, a turntable mounted proximate said rear end, a boom mounted on said turntable, front wheel means secured to said chassis proximate said front end, rear wheel means secured to said chassis proximate said rear end, an engine mounted on said chassis between said cab and said rear wheels, drive means coupled between said engine and said rear wheels, said elongated chassis between said turntable and an area between said engine and said cab being formed of a plurality of joined box sections extending lengthwise of said chassis to provide high rigidity to said chassis against twisting.

2. A vehicle as set forth in claim 1 wherein the weight distribution of said boom carrying vehicle is approximately two thirds on said rear wheel means and one third on said front wheel means.

3. A vehicle as set forth in claim 1 wherein said engine is enclosed within a housing, a radiator for said engine, fan means for blowing cooling air through said radiator and through said housing, and a control panel located between said cab and said engine to receive the warming effect of air which was warmed by passing through said radiator.

4. A vehicle as set forth in claim 3 wherein said radiator is mounted between said rear wheels and said engine.

5. A vehicle as set forth in claim 3 wherein said control panel is located proximate said cab, and an operator platform proximate said control panel.

6. A vehicle as set forth in claim 1 wherein said plurality of box sections comprise first and second spaced substantially rectangular box sections extending from a point to the rear of said turntable to a point forwardly of said engine, and cross-frame section means joining said first and second rectangular sections in said spaced relationship.

7. A vehicle as set forth in claim 6 wherein said cross-frame section means include a third box-section extending crosswise between said spaced rectangular box sections and being located between said turntable and said engine.

8. A vehicle as set forth in claim 7 including a plurality of cross-frame members extending crosswise between said first and second box sections substantially below said turntable, and a support for said turntable formed integrally with said chassis.

9. A vehicle as set forth in claim 7 wherein said chassis includes a fourth box section extending lengthwise of said first and second box sections between said engine and said cab.

10. A vehicle as set forth in claim 9 including a bulkhead between said fourth box section and said cab, a plurality of channel members forming extensions of said first and second box sections between said bulkhead and said cab, and plate means converting said channel members into additional box sections immediately adjacent said bulkhead.

11. A vehicle as set forth in claim 9 wherein said engine is mounted on said chassis immediately forward of said rear wheels and is facing rearwardly.

12. A vehicle as set forth in claim 9 including a radiator mounted above said rear wheel means, and fan means for forcing air through said radiator and over said engine toward the front of said boom-carrying vehicle.

13. A vehicle construction comprising a frame having a front end and a rear end, a cab located proximate said front end, front wheels located proximate said front end, rear wheels located proximate said rear end, an engine mounted on said frame between said front and rear wheels, a control panel on said frame between said cab and said engine, and fan means for directing air heated by said engine toward said control panel to keep said control panel warm in cold weather.

14. A vehicle construction as set forth in claim 13 wherein said engine is mounted extending rearwardly, a radiator associated with said engine, said fan means causing air to flow through said radiator and toward said control panel.

15. A vehicle construction as set forth in claim 13 including an operator platform proximate said control panel.

16. A vehicle construction as set forth in claim 15 wherein said operator platform is positioned between said cab and said control panel.

* * * * *